United States Patent [19]
Calbeck

[11] 3,904,375
[45] Sept. 9, 1975

[54] FLUOSOLID REACTOR FOR PRODUCING METALLIC SULPHATES

[75] Inventor: John H. Calbeck, Pratt, Kans.

[73] Assignee: J. R. Calbeck, Trustee, Pratt, Kans.

[22] Filed: July 30, 1973

[21] Appl. No.: 384,056

[52] U.S. Cl.............. 23/277 R; 23/284; 34/57 A; 75/9; 423/544; 423/548; 423/566; 423/659; 432/58
[51] Int. Cl.² .................. C10G 9/06; B01J 8/24
[58] Field of Search............. 23/277 R, 284, 288 S; 432/58; 34/57 A; 75/9, 26; 423/544, 659, 423/566, 548

[56] References Cited
UNITED STATES PATENTS

| | | | |
|---|---|---|---|
| 2,343,780 | 3/1944 | Lewis | 75/26 |
| 2,586,818 | 2/1952 | Harms | 75/9 UX |
| 3,040,438 | 6/1962 | Perlman et al. | 34/57 A |
| 3,040,439 | 6/1962 | Frost | 23/288 S X |
| 3,192,644 | 7/1965 | Knibbs et al. | 23/288 S X |
| 3,394,136 | 7/1968 | Moore et al. | 23/284 X |

Primary Examiner—James H. Tayman, Jr.
Attorney, Agent, or Firm—John H. Widdowson

[57] ABSTRACT

A fluosolid reactor for producing metallic sulphates having a cylindrical reaction chamber vertically positioned at one end of a furnace. A feeder conduit with an auger internally disposed and driven by a motor introduces a mixture of metallic sulphides, the corresponding metallic sulphates, and ammonium sulphate into the reaction chamber. A perforated plate is attached to the inside walls of the reaction chamber in the lower portion thereof whereupon the mixture lodges to be directly heated by products of combustion of a heating fuel produced by the furnace.

8 Claims, 3 Drawing Figures

PATENTED SEP 9 1975          3,904,375

FLUOSOLID REACTOR FOR PRODUCING METALLIC SULPHATES

BACKGROUND OF THE INVENTION

1. Field of the Invention

This invention is related to a fluosolid reactor. More specifically, this invention provides a fluosolid reactor for an improved process for preparing metallic sulphates from mixing of metallic sulphide ores, such as sphalerite, galena, pyrite, etc., with ammonium sulphate.

2. Description of the Prior Art

Conventional calcining furnaces of several kinds have formerly been used for producing metallic sulphates from sulphating metallic sulphide concentrates with ammonium sulphate. The earliest of the calcining furnaces was a raked muffle made of fire bricks and used very heavy rabbles. The raking mechanism was rugged and withstood the difficult raking of a pasty charge, but is was not air tight and about one third of the elemental sulphur was oxidized in accordance with Reaction (1).

$$2(NH_4)_2SO_4 + S^= + 1.5O_2 \rightarrow SO_4^= + 2(NH_4)_2SO_3 \quad (1)$$

The raked muffle was followed by an air tight furnace constructed of cast iron. It had two mechanically raked hearths and withstood difficult raking with frequent clean outs. However, the cast iron corroded badly and frequent replacing of the expensive iron was required.

A more satisfactory furnace which followed the prior two consisted essentially of an air tight cylindrical alloy retort rotating in a furnace, and the heat for promoting the reaction on the inside was supplied by a fire on the outisde of the tube. It had a thermal efficiency of only 32%. As the temperature on the inside of the retort approached about 150°C, fusion and decomposition of ammonium sulphate began as represented by Reaction (2).

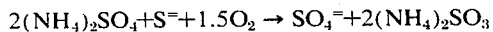

$$(NH_4)SO_4 \xrightarrow[150°C]{\Delta} NH_4HSO_4 + NH_3 \quad (2)$$

The fused mixture formed a viscous pasty mass and was highly corrosive to the cylindrical alloy retort, and the tubes within the retort had to be repaired and replaced frequently. The fused mass remained pasty, semi-fluid and sticky until Reaction (2) was more than half completed; this necessitated the use of heavy tumbling rails within the tube to break up the sticky, pasty lumps in order to keep the charge moving through the cylindrical alloy retort. As the charge progressed through the retort, the semi-fluid condition diminished as the temperature approached 200°C, because the ammonium bisulphate of Reaction (2) began to react with the metallic sulphide and produce metallic sulphate and volatile products in accordance with equation:

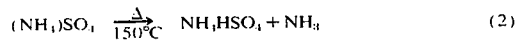

$$2NH_4HSO_4 + S \xrightarrow[300°C]{\Delta} SO_4^= + S + SO_2 + NH_3 \quad (3)$$

Elemental sulphur in this reaction was liquid until the temperature reached approximately 300°C or higher. Liquid sulphur prolonged the semi-fluid condition of the pasty charge to additionally hinder the progression of the charge through the alloy retort. It was not until the temperature of the charge reached approximately 350°C before the percentage of metallic sulphate in the mix increased and the pasty condition of the charge was terminated, thereby no longer hindering the proper movement of the charge through the retort.

An internally fired air-tight rotary kiln with a refractory liner solved the corrosion problem of the cylindrical alloy retort and the cast iron furnace. The internally fired rotary kiln differed from the three earlier furnaces in that heating of the mixture included directly contacting the mixture with products of combustion gases, as opposed to internally disposing of the mixture within a housing means and heating the outside of the housing (or retort) with fire. Tumbling rails still had to be used with the rotary kiln in order to keep the product moving through the kiln, and the nature of the volatile products of Reaction (3) was altered because these reaction vapors were diluted by the combustion gases, such as $CO_2$, $H_2O$ and $N_2$. Ammonia of Reaction (3) could not be collected because a high concentration of ammonium carbonate had been formed in accordance with the following reaction:

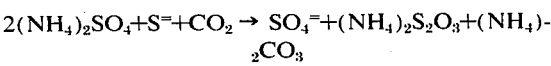

$$2(NH_4)_2SO_4 + S^= + CO_2 \rightarrow SO_4^= + (NH_4)_2S_2O_3 + (NH_4)_2CO_3 \quad (4)$$

Therefore, from the aforementioned discussion, what is needed and what has been invented by me is a fluosolid reactor for preparing metallic sulphates from the mixing of the corresponding metallic sulphide ores with ammonium sulphate which overcomes all of the foregoing deficiencies associated with conventional calcining furnaces. More specifically, I have invented an improved calcining furnace for preparing or refining zinc sulphate which is particularly adapted to be combined with known processing of refining zinc sulphate in accordance with Reactions (2) and (3).

SUMMARY OF THE INVENTION

The present invention accomplishes its desired objects by broadly providing a fluosolid reactor for producing metallic sulphates comprising a reaction chamber having an exit, means for introducing into the reaction chamber a mixture of metallic sulphides, the corresponding metallic sulphates, and ammonium sulphate, means for discharging from the reaction chamber the produced metallic sulphate including the metallic sulphides in suspension, and means for producing products of combustion of a heating fuel for directly contacting and heating the mixture to produce the metallic sulphates. The fluosolid reactor additionally includes means for lodging the mixture while being directly contacted and heated with the products of combustion, and means for diluting the products of combustion with a diluting gas to partially eliminate pasty and semi-fluid conditions within the reaction chamber. The fluosolid reactor also additionally includes means for circulating the produced metallic sulphates including the metallic sulphides in suspension to the means for introducing the mixture, and means for introducing into the reaction chamber a new fuel gas.

Therefore, it is an object of the present invention to provide an improved furnace for producing metallic sulphates, such as zinc sulphate.

It is another object of this invention to provide a fluosolid reactor for producing a metallic sulphate that eliminates or reduces both the physical and the chemical difficulties encountered in heating a mixture of a corresponding metallic sulphide ores and ammonium sulphate by conventional apparatuses.

It is yet another object of this invention to provide a fluosolid reactor for increasing the production of a metallic sulphate over conventional apparatuses which heat a mixture of a corresponding metallic sulphide ore and ammonium sulphate.

It is still yet another object of this invention to provide a fluosolid reactor that produces metallic sulphate and recoverable vapors produced at an efficiency better than 95% and which is relatively economical to install and manufacture.

These, together with various ancillary objects and features which will become apparent to those skilled in the art as the following description proceeds, are attained by this novel fluosolid reactor, a preferred embodiment being shown with reference to the accompanying drawings, by way of example only, wherein:

DETAILED DESCRIPTION OF THE INVENTION

Figure 1:
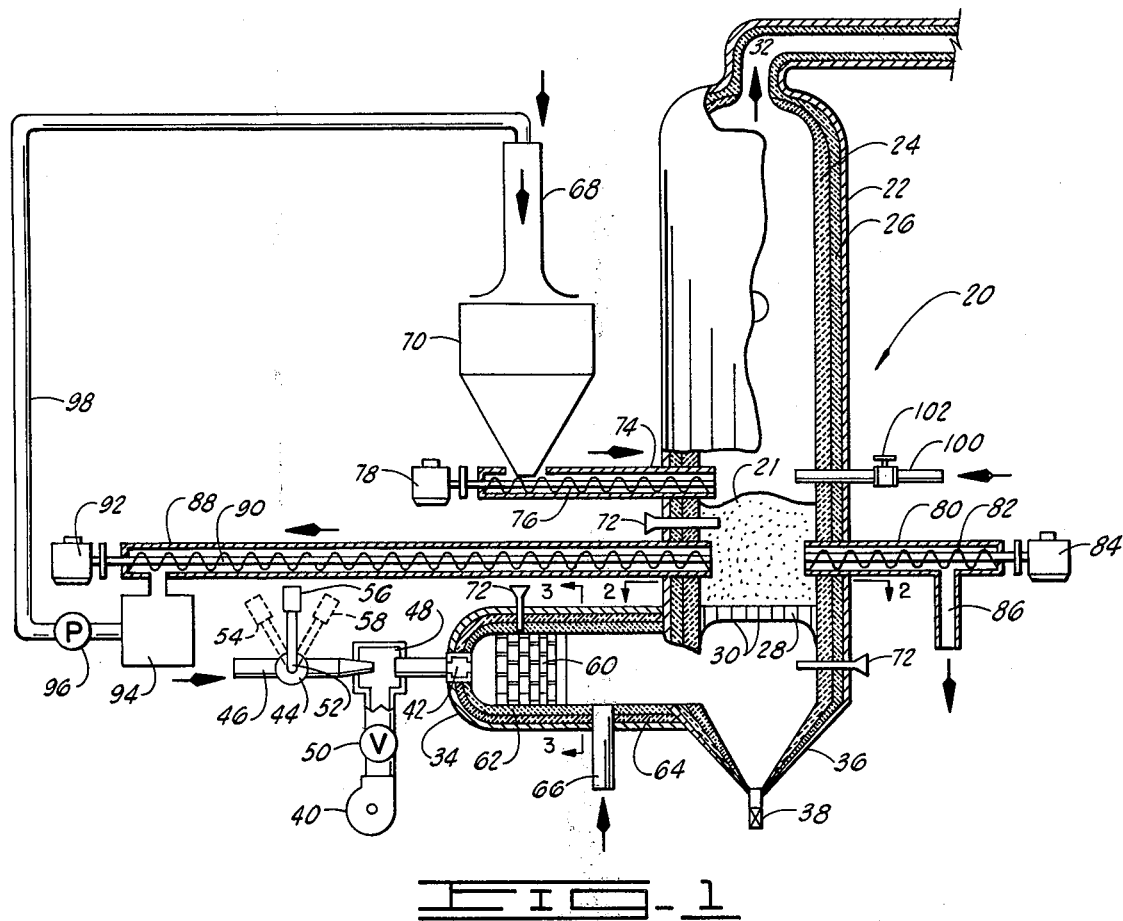
FIG. 1 is a fragmentary partial vertical sectional view of the fluosolid reactor.
Figure 2:
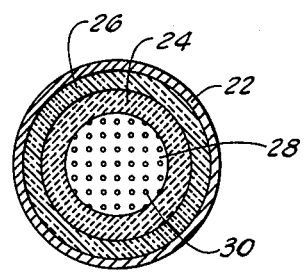
FIG. 2 is a horizontal sectional view taken along line 2—2 in FIG. 1.
Figure 3:
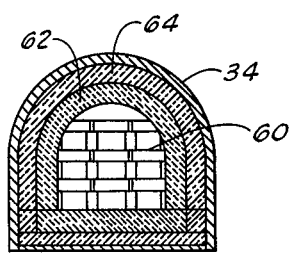
FIG. 3 is a vertical sectional view taken along the line 3—3 in FIG. 1.

Referring in detail now to the drawings for illustration of the fluosolid reactor, wherein like or similar parts of the invention are identified by like reference, and particularly in FIG. 1, there is seen in general a fluosolid reactor 20 including a cylindrical reaction chamber 22 vertically positioned and having a refractory lining 24, an insulation 26 and a perforated plate 28 with fluidized bed 21 resting thereon. Plate 28 is circular with vertically disposed apertures 30 extending entirely therethrough and circumferentially attaches to the inside of reaction chamber 22 in the lower portion thereof such that the height of exit 32, which is positioned in the upper portion of reaction chamber 22, is no less than about five times the diameter of reaction chamber 22. Preferably, plate 28 is situated such that the height of exit 32 above plate 28 is between about five to about 15 times the diameter of chamber 22 to provide suitable space for stabilizing all vapors resulting from heating of a mixture of metallic sulphide concentrates, the corresponding metallic sulphate, and ammonium sulphate which lodge on plate 28 as the vapors leave reaction chamber 22 through exit 32.

A heating furnace 34 is horizontally disposed with respect to reaction chamber 22 and produces products of combustion of a heating fuel for directly contacting and heating fluidized bed 21 to produce metallic sulphates. Reaction chamber 22 is attached at the top of one end of furnace 34 and is in communication therewith. A conical pit 36 is positioned on the bottom of furnace 34 directly under chamber 22 and includes a petcock 38 in the convergent vertex for discharging combustion residue or fluidized material which has fallen through apertures 30. The opposite end of furnace 34 has in combination a blower 40, a burner 42, and means 44 for producing an oxidizing or reducing atmosphere within furnace 34 when the heating fuel is fed through conduit 46 into mixing chamber 48 to be burned by burner 42 when blown thereto by blower 40 from the chamber 48. Valve 50 regulates the flow of air blown by blower 40 into mixing chamber 48. Means 44 for producing an oxidizing or reducing atmosphere is well known to those skilled in the art. When manual control handle 52 of means 44 is in position 54, a reducing atmosphere will be produced within furnace 34. Positions 56 and 58 will produce a neutral atmosphere and an oxidizing atmosphere, respectively, within furnace 34.

A brick checkerwork 60 is internally disposed within furnace 34 to effect perfect combustion of the gases leaving burner 42 and to act as reforming compartment in case a small percent of reducing gases is required in the heating gases. Furnace 34 also includes refractory lining 62 and insulation 64. A reactor diluting gas may be introduced through conduit 66 if no provisions have been made for reducing the heating gases from a combustion temperature to a heating temperature. Conduit 66 is situated between reaction chamber 22 and brick checkerwork 60 for diluting the products of combustion to eliminate pasty and semi-fluid conditions within the reaction chamber 22. Pyrometers 72 are situated in the tops of conical pit 36, furnace 34 and at the bottom of reaction chamber 22 to provide temperatures of all respective places.

Pipe 68 introduces a mixture of metallic sulphides, the corresponding metallic sulphates, and ammonium sulphate into mixing bin 70 where mixing occurs. This mixture of ores is subsequently discharged into conduit feeder 74 which has an auger 76 internally disposed and driven by a motor 78 for feeding the mixture of ores into fluosolid reactor 20. Feeder conduit 74 should be positioned above plate 28 at a height equal to between about one-half to about four times the internal diameter of reaction chamber 22.

Discharge conduit 80 has an auger 82 internally disposed and driven by motor 84 for flight means to discharge the produced metallic sulphate including metallic sulphides in suspension through conduit 86. Discharge conduit 80 is situated lower than feeder conduit 74.

Circulation conduit 88 is also situated lower than feeder conduit 74 and has auger 90 internally disposed and driven by motor 92 for circulating produced metallic sulphates including metallic sulphides in suspension out of reaction chamber 22 and into storage tank 94. Pump 96 transfers the produced metallic sulphates plus metallic sulphides from storage tank 94 into pipe 68 via conduit 98.

Conduit 100 introduces raw fuel gas into reaction chamber 22 and is essentially diametrically positioned with respect to feeder conduit 74. Valve 102 regulates the flow of raw gas through conduit 100.

In operation of the invention, a charge may be prepared and introduced into reaction chamber 22 from mixing bin 70 via conduit 74. The charge is composed of a mixture of a metallic sulphide (e.g. zinc sulphide, copper sulphide, iron sulphide, cadmium sulphide, or etc.), the corresponding anhydrous metallic sulphate and ammonium sulphate. In a preferred embodiment, the metallic constituent is zinc. The charge mixture may consist of about 23 to 73% weight of ammonium sulphate, about 25 to 75% weight of the corresponding metallic sulphide concentrates, and approximately 2 to 14% weight of the corresponding metallic sulphate.

The mixture should consist of a proportionate amount of each substance so that the fluidized bed 21 situated on top of perforated plate 28 includes between about 40 and 60% by volume of the anhydrous corresponding metallic sulphate. Also, the bulk density of bed 21 should be between about 50 and 90 pounds per cubic feet and include a particle size ranging between about 10 and about 60 mesh. It has been found that in order to achieve the preferred ranges for density and volume, the preferred embodiment of the invention comprises a mixture of about 42% weight ammonium sulphate, about 50% weight zinc sulphide concentrates, and approximately 8% weight of anhydrous zinc sulphate.

Initially adding to the mixture of zinc sulphide and ammonium sulphate, a quantity of zinc sulphate (preferably anhydrous) is one of the most important features in operating fluosolid reactor 20 of the invention. This addition will inhibit the development of semi-fluid conditions in the reaction of the zinc sulphide concentrates with the ammonium sulphate. The close contact of the zinc sulphate crystals with ammonium sulphate crystals react to form a double salt as fusion of the ammonium sulphate commences and also, the zinc sulphate begins to dissolve in the melting ammonium sulphate as rapidly as it forms to additionally inhibit fusion of the ammonium sulphate into a semi-fluid.

The metallic or zinc sulphide concentrates and the metallic or zinc sulphate concentrates may consist of new concentrates or unreacted concentrates returning from storage tank 94. The ammonium sulphate may also be newly added ammonium sulphate, or it may be recycled ammonium sulphate resulting from the manufacture of zinc sulphide pigments in accordance with the reaction;

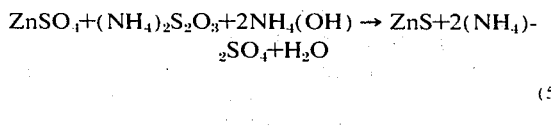

(5)

which was fully disclosed in my U.S. Pat. No. 3,443,888, patented on May 13, 1969.

The mixture enters cylindrical reaction chamber 22 through conduit bed feeder 74 and discharges through discharge conduit 80. Conduit 80 is positioned lower than feeder conduit 74 because at a temperature of 350°C and above, a small percent of the free ammonium generated flashes off as the charge drops into the fluidized bed 21. The rate of feed which the mixed charge progress through conduit 74 depends on the size of cylindrical reaction chamber 22, the nature of the corresponding metallic sulphide concentrates, and the temperature. It has been found in a majority of cases that a good general rule in the preferred embodiment is to feed cylindrical reaction chamber 22 at a rate of approximately between about 80 to 120 pounds per hour per every 400 pounds of fluidized bed 21 with the preferred rate being approximately 100 pounds per hour per every 400 pounds of fluidized bed 21 positioned on top of perforated plate 28. If the feed rate through conduit 74 becomes too fast or a sudden drop in temperature occurs in furnace 34, large lumps of unreacted mixes will appear on the surface of the fluidized bed 21. When this occurs, normal feeding to conduit 74 should be terminated, and the normal discharge through discharge conduit 80 should be recirculated to mixing bin 70 until the lumps break up.

The mixed charge lodges on perforated plate 28 and heating within the furnace 34 is maintained at a temperature high enough to maintain the temperature above plate 28 between about 150° and 480°C, with the preferred range between about 300° and 450°C. Fluidization of the mixed charge does not depend on the temperature of the gases but depends on the volume of gases which contact the charge. Heating is preferably accomplished by directly heating the mixture with products of combustion of a gas introduced into furnace 34 via conduit 46. The gas is preferably a heating fuel selected from the group consisting of water gas, producer gas, natural gas, and mixtures thereof, burning a neutral flame, or any fuel gas which is void of suspended solid particles that would contaminate the zinc sulphide concentrates or plug the orifices of perforated plate 28. It is preferably necessary in some cases to have a slight reducing condition within furnace 34 to correct for any air which has infiltrated into furnace 34. As aforementioned means 44 for producing an oxidizing or reducing atmosphere within furnace 34 is well known within the art. Positioning manual control handle 52 in position 54 creates a reducing atmosphere within furnace 34. Another way to create a reducing condition which is also well known within the art is to use a slight deficiency of air blown by blower 40 within the heating gas. It is desirable that the heating fuel have between about 1 volume and 6% volume of reducing gases selected from the group consisting of hydrogen, carbon monoxide, and mixtures thereof. Between 1 volume and 6% volume of reducing gases in the heating fuel may be obtained by utilization of a heating fuel including combustible gaseous mixture having air being supplied thereto at a rate of between about 75 to about 99% of the theoretical rate necessary for complete combustion of the gaseous mixture to form reducing gases therein. Theoretical rates necessary for complete combustion of gases are well known within the art and may be found from any gas graphs such as those published by the AIME. The presence of these certain reducing gases (e.g. CO, $H_2$, etc.) in the reaction zone of reaction chamber 22 resulting from incomplete combustion due to insufficiency of air, enables any excess $SO_2$ formed from the reaction of metallic sulphate and sulphur to be reduced back to elemental sulphur in accordance with Reactions (6) and (7) below and thereby restore balance to Reaction (3).

$$SO_2 + 2CO \rightarrow S + 2CO_2 \qquad (6)$$
$$SO_2 + 2H_2 \rightarrow S + 2H_2O \qquad (7)$$

Thus the reaction of metallic sulphate and sulphate is inhibited because evolving $SO_2$ is rapidly removed from over the charge within the reaction zone of reaction chamber 22. The rapid removal of $SO_2$ also increases the rate of reaction of ammonium bisulphate with the metallic sulphide ore and reduces the pasty character of the charge to thereby improve the mechanical operation of fluosolid reaction 20.

I have also discovered that since the vapors above the fluidized bed 21 in reaction chamber 22 have a lower temperature than the fluidized bed 21 itself the addition of reducing gases may be added to the vapors and do not have to result from burning insufficient air for combustion within the burner. If injection into the vapors is desirable, it is best accomplished by injecting a raw fuel gas through conduit 100 having valve 102 situated within to regulate flow. The injection should be at a rate of between about 1 and 10% of the rate of gas (products of combustion) being added to furnace 34 by blower 40. The fuel gas may be selected from the group consisting of water gas, producer gas, and mixtures thereof. The addition of a raw fuel gas into the vapors directly promotes the reduction of excess sulphur dioxide back to elemental sulphur as was accomplished by burning the heating fuel with insufficient air.

Another desirable way to correct the destructive side reactions, such as oxidation of elemental sulphur and sulphiding of newly formed metallic sulphate, is diluting the products of combustion of the heating fuel with a diluent gas. Dilution of products of combustion is best accomplished through conduit 66 and the diluting gas may be selected from steam, nitrogen or recirculated gases (ammonia and carbon dioxide) from absorption towers (not shown in the drawings). In a preferred embodiment, steam is the diluting gas and enters furnace 34 through conduit 66. An advantage of dilution of combustion gases is that the partial pressure of elemental sulphur is reduced and sulphur evaporates at a lower temperature to partially eliminate pasty and semi-fluid conditions. Another advantage to diluting of combustion gases is that not only will the partial pressure of sulphur be reduced, but partial pressures of all volatile products will be reduced and their evaporation rates increased which augments the capacity of reaction chamber 22 and the process is improved. Steam dilution will also assist in reclaiming volatile products in the absorption towers. The diluting rate may be anywhere from about 8.0 to 12.0 parts of steam to 1 part of heating fuel entering furnace 34 through conduit 46 with the preferred embodiment calling for about 10.0 parts of steam by volume to 1 part of heating fuel entering furnace 34 through conduit 46 by volume. With no steam dilution, zinc sulphate may be between 85 to 90% sulphide at a temperature of about 300°C in about 1.5 hours by liquid sulphur, or concentrated vapors of sulphur. But with a contact time of only a few minutes and a sulphur dilution of about 10.0 to 1, sulphidation of zinc sulphate is essentially insignificant at temperatures as high as even 400°C or above. It has been discovered that at a temperature of around 200°C and in one hour sulphur vapors that have been diluted at about 100 to 1 will only about 1% sulphided zinc sulphate. Diluting with steam is better than other methods of controlling the temperatures of the products of combustion below plate 28 because steam cooling retains most of the available heat units within the combustion gases. In some cases I have found that it might be worthwhile to insert heat exchange cooling tubes (not shown in the drawings) within furnace 34 to heat water or generate steam.

Perhaps the best preventative of all for controlling many of the undesirable destructive side reactions is careful temperature control between temperatures of about 300° and 350°C of the reaction zone within reaction chamber 22. A laboratory study of the reaction rates of zinc sulphide and ammonium sulphate show that the reaction is very slow below a temperature of about 250°C, averaging about 10% for the first 80 minutes. At a temperature of about 350°C, 80% of the reaction is completed in 80 minutes and when the temperature is above 450°C, 95% of the reaction is completed in less than 20 minutes. By keeping within temperatures of between about 300° and 350°C, many of the side reactions will not be objectionable. The volume of the products of combustion of the heating gases that provide heat for fluidizing the charge within reaction chamber 22 must be carefully formulated to be substantially free of volatile products, except the normal proportions of $H_2O$, $CO_2$, and $N_2$, and also free, as previously mentioned, of all suspended solid particles. The dilution gases should also be free of suspended solids.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. A fluosolid reactor for producing metallic sulphates comprising a reaction chamber having an exit, means attached to said chamber for introducing into said reaction chamber a mixture of metallic sulphides, the corresponding metallic sulphates, and ammonium sulphate, means connected to said chamber for discharging from said reaction chamber said produced metallic sulphates including said metallic sulphides in suspension, means attached to said chamber for producing products of combustion of a heating fuel for directly contacting and heating said mixture to produce said metallic sulphates, means secured to said chamber for lodging said mixture while being directly contacted and heated with said products of combustion, said means for lodging comprising a plate connected to the inside walls of said reaction chamber and said plate includes a structure defining a plurality of apertures extending entirely therethrough, and a means attached to said chamber for circulating a fraction of said produced metallic sulphates including said metallic sulphides in suspension to said means for introducing, said means for discharging being situated lower than said means for introducing said mixture, and said means for circulating said produced metallic sulphates being positioned lower than said means for introducing said mixture and generally diametrically opposed to said means for discharging, said means for producing products of combustion is a furnace horizontally disposed with respect to said reaction chamber and having a first end and a second end, said first end of said furnace comprises said reaction chamber attached at the top thereof in communication therewith and a pit positioned in the bottom thereof generally directly under said reaction chamber, said pit is conically shaped and includes a petcock in the convergent vertex for discharging combustion residue, said second end of said furnace includes in combination a blower, a burner and means for producing an oxidizing or reducing atmosphere when said heating fuel is burned by said burner, a brick checkerwork connects to the inside of said furnace in proximity to said second end for holding temperature of said mixture from between about 300° and about 450°C, and said means for diluting said products of combustion is positioned between said reaction chamber and said brick checkerwork to control temperature and chemical properties.

2. The fluosolid reactor of claim 1 additionally including means for diluting said products of combustion with a diluting gas to partially eliminate pasty and semifluid conditions within said reaction chamber and to control the chemical composition of all emitted vapors for efficient recovery.

3. The fluosolid reactor of claim 1 additionally including means for introducing into said reaction chamber a raw fuel gas to control the chemical composition of all emitted vapors for efficient recovery.

4. The fluosolid reactor of claim 1 wherein said reaction chamber is essentially cylindrical and vertically situated on said means for producing products of combustion, said exit is positioned in the upper portion of said chamber, said plate is generally circularly shaped and circumferentially attached to the inside of said chamber in the lower portion thereof such that the height of said exit above said plate is between about five to 15 times the diameter of said chamber to provide suitable space for stabilizing all vapors resulting from said heating of said mixture before said vapors exit through said exit.

5. The fluosolid reactor of claim 4 wherein said means for introducing said mixture into said chamber is positioned between approximately one-half to four times said diameter of said chamber above said plate.

6. The fluosolid reactor of claim 5 wherein said means for introducing raw fuel gas is essentially diametrically positioned with respect to said means for introducing said mixture.

7. The fluosolid reactor of claim 1 third said means for introducing comprises a first conduit in communication with the inside of said reaction chamber, a first auger internally disposed within said first conduit, a mixing bin in communication with said first conduit and said first auger, and means for revolving said first auger, and said means for discharging includes a second conduit in communication with the inside of said reaction chamber, a second auger internally disposed within said second conduit and means for revolving said second auger, and said means for circulating comprises a third conduit in communication with the inside of said reaction chamber, a thrid auger internally disposed within said third conduit, and means for revolving said third auger.

8. The fluosolid reactor of claim 7 wherein said means for circulating additionally includes a storage tank in communication with said third conduit and said third auger, and a means for transferring said produced metallic sulphates including said metallic sulphides in suspension from said storage tank to said mixing bin.

* * * * *

UNITED STATES PATENT OFFICE
CERTIFICATE OF CORRECTION

PATENT NO. : 3,904,375
DATED : September 9, 1975
INVENTOR(S) : John H. Calbeck

It is certified that error appears in the above-identified patent and that said Letters Patent are hereby corrected as shown below:

Column 6, line 57, delete "reaction" and insert therefor ---reactor---.

Column 7, line 44, delete "100" and insert therefor ---10.0---

Column 10, Claim 7, line 1, delete "third" and insert therefor ---wherein---.

Signed and Sealed this twenty-fifth Day of November 1975

[SEAL]

Attest:

RUTH C. MASON
Attesting Officer

C. MARSHALL DANN
Commissioner of Patents and Trademarks